UNITED STATES PATENT OFFICE 2,641,586

THIXOTROPIC COMPOSITIONS

Birger W. Nordlander, Schenectady, and John A. Loritsch, Scotia, N. Y., assignors to General Electric Company, a corporation of New York No Drawing. Application December 31, 1949, Serial No. 136,413

11 Claims. (Cl. 260—40)

This invention relates to thixotropic compositions, and more particularly to polymerizable thixotropic coating and filling compositions comprising a polymerizable liquid and a filler.

A problem of long standing encountered in factory practice in connection with the use of conventional varnishes for coating or filling applications is the excessive drainage from the coated or filled part after the varnish has been applied. A portion of this drainage occurs at room temperature immediately after the part has been removed from the treating tank because of the fluid nature of the conventional varnishes generally employed. This drainage continues until sufficient solvent has evaporated to cause the viscosity of the varnish on the surface or in the interstices of the treated object to become sufficiently high to enable it to remain in position. It is obvious that the nature of the process is such that too much of the varnish drains away from the top of the treated part and a surplus collects at the bottom of the part, resulting in a very uneven and undesirable ultimate distribution of the varnish base throughout the part. Further drainage occurs during the early stages of any baking process which might be involved, when the varnish base remaining in the treated part becomes increasingly fluid as the temperature is increased. This drainage will continue until the temperature is sufficiently high, and has been applied sufficiently long to cause the varnish to thicken or "skin over" due to polymerization reactions of one type or another, such as condensation, oxidation and addition reactions. Conventional varnishes also have a disadvantage in that they draw away from sharp corners and edges, leaving these regions practically bare.

The net result of methods of coating and filling in such a manner is very uneconomical utilization of the weight of varnish originally applied, only a fraction being retained. Furthermore, an undesirably uneven distribution of the varnish in the interstices and on the surface of the treated part results.

Where the problem of coating or filling electrical devices, such as, for example, electrical coils, has been involved, the amount of material retained after a single application is in most cases insufficient to afford a structure having the required electrical and mechanical properties. Several successive applications and bakings are usually necessary, adding considerably to the cost of the treatment. In the case of open structures, such as electrical coils, a complete filling becomes impossible employing the coating and filling compositions heretofore known in the art, not only because of the fact that the inert, volatile solvent in the composition must be expelled after each application, but also because many voids are sealed off during the evaporation of the solvents. In many cases these voids cannot be filled by additional varnish regardless of how many subsequent treatments are applied to the structure. This causes the treated structure to have an unequal thermal conductivity from one part to another as well as a much lower overall heat dissipation rate as compared with a completely void-free structure. In high voltage equipment the presence of voids in the insulation also gives rise to internal corona discharge with resulting deterioration of the insulation.

Certain of the above difficulties can be eliminated by the use of so-called solventless varnishes. This term is intended in the present disclosure to cover compositions of matter which are polymerizable fluids substantially free of inert, volatile solvents such as those used in conventional varnishes, and which, by the incorporation of suitable catalysts, may be caused to polymerize to form substantially infusible and insoluble materials without the necessity of taking up oxygen from the air and without forming volatile products.

Since the conversion from the fluid to the hard, infusible stage occurs with little or no loss of the weight of material applied in the coating or filling operation, it is possible, by the use of proper vacuum-pressure impregnating technique, not only to fill completely all the spaces in an open structure, such as a coil, but also to maintain this condition subsequently during the curing operation, provided that substantially no drainage of varnish occurs during the baking process.

Many of the solventless varnishes of the type with which the present invention is concerned, and which will be hereinafter more fully described, comprise fairly fluid, non-volatile compositions. Therefore, in comparison with the conventional varnishes containing highly viscous or solid bases, these solventless varnish compositions suffer the disadvantage that they do not become increasingly viscous on standing at room temperature by the evaporation of a volatile inert solvent. As a result an open structure coated or filled with such a solventless varnish composition will continuously suffer loss of the varnish by drainage after it has been withdrawn from the treating tank and before it has been polymerized by heating. Furthermore, in common with the conventional varnishes containing appreciable amounts of solvents, many of the solventless varnishes have the disadvantage that during the early stages of the curing process their viscosity is substantially reduced, further aggravating the drainage problem. The difficulties arising out of this property of the solventless varnishes in many cases have proved to be serious enough to offset the principal advantage in using the solventless varnishes for the filling of open structures.

It is an object of the present invention to provide liquid coating and filling compositions which will not drain from an object prior to and during curing.

Another object of this invention is to provide coating and filling compositions which may be applied and cured without loss of the composition.

A further object of the present invention is to provide coating and filling compositions which when applied to objects will remain in situ before and during curing even on corners and edges.

It has been discovered that the advantages in the use of solventless varnishes may be realized in coating and filling operations and at the same time the disadvantage of excessive drainage may be avoided by employing the compositions of this invention. These compositions may be converted by means of heat to an infusible and insoluble state and are suitable in general for coating and filling operations and particularly for the insulation of electrical equipment. After a coating of one of the present compositions has been applied to a part, little or no drainage of the composition from the part occurs, either at room temperature or at the elevated temperatures required for complete conversion of the composition to the infusible and insoluble state. The unusual combination of properties characterizing these compositions rests in the discovery that suitable quantities of certain specific fillers, in combination with solventless varnishes or polymerizable liquids, form compositions which are fluid as long as they are kept in an agitated condition but solidify shortly after agitation has ceased and will not flow either at room temperature or at temperatures up to about 150° C., unless mechanically disturbed before they have hardened by polymerization.

While it is well-known that the incorporation of fillers into a varnish will reduce the flow of the resulting mixture by reason of increased viscosity, this general property is not relied upon for the properties of the present compositions. The specific fillers which are here employed with solventless varnishes form thixotropic compositions capable of undergoing isothermal, reversible, sol-gel transformations, a fluid sol condition existing as long as the mixture is agitated, the sol reverting to a gel within a very short time after agitation has ceased. However, upon heating the gel it polymerizes into an infusible product which is no longer capable of reversion to the fluid sol state. The system may be simply expressed by the following relationship:

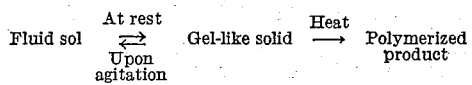

The term "thixotropy" is used herein to denote the property of a fluid filler-liquid composition to revert rapidly on standing into a gel-like mass having sufficient cohesive strength to withstand distortion by gravitational force when suspended freely as in an inverted receptacle or on a coated object. The gel is also of such a nature that it can be fluidified by the application of mechanical agitation as by shaking, stirring, vibrating, etc. The property of thixotropy as understood herein is thus characterized by a reversible isothermal sol ⇌ gel transition.

The compositions referred to above as solventless varnishes which are employed in combination with specific fillers to form the thixotropic composition of this invention are polymerizable fluids comprising an unsaturated alkyd resin. These liquid unsaturated alkyd resins are the reaction products of polyhydric alcohols, mixtures of polyhydric alcohols or mixtures of polyhydric and monohydric alcohols, and an alpha unsaturated alpha,beta polycarboxylic acid or a plurality of polycarboxylic acids, one of which, at least, is unsaturated polycarboxylic acid, the resinous material having an acid value of up to 60 and preferably between 45 and 60. Examples of such polyhydric alcohols are ethylene glycol, di- and triethylene glycols, propylene glycol, trimethylene glycol, tetramethylene glycol, pentamethylene glycol, glycerine or pentaerythritol in combination with a monohydric alcohol, etc. Examples of alpha unsaturated alpha,beta polycarboxylic acids are maleic, fumaric, and itaconic acids. Anhydrides of polycarboxylic acids may also be employed. The term "polycarboxylic acid" as used herein is intended to include within its meaning the anhydrides of such acids. In addition to one or more of the unsaturated polycarboxylic acids, saturated polycarboxylic acids may also be present in the reaction mixture in the preparation of the resins referred to above. Examples of such saturated polycarboxylic acids are succinic, adipic, sebacic and phthalic acids.

In addition to the above unsaturated alkyd resins, the polymerizable fluids which are used in the present compositions may contain polymerizable substances such as, for example, esters of unsaturated monohydric alcohols and polycarboxylic acids, including unsaturated polycarboxylic acids, halogenated aromatic polycarboxylic acids and polybasic inorganic acids. Examples of such substances are diallyl phthalate, diallyl succinate, diallyl maleate, diallyl fumarate, diallyl itaconate, diallyl chlorophthalates, and triallyl phosphate. Other substances which may be incorporated in these polymerizable liquids are esters of monohydric alcohols and unsaturated polycarboxylic acids which are capable of copolymerizing with unsaturated alkyd resins such as, for example, dioctyl itaconate, dibenzyl itaconate, diethyl fumarate and dibenzyl fumarate.

The thixotropic compositions of this invention may be converted into an infusible insoluble state by means of heat alone, for example, by curing parts coated or filled with these compositions at temperatures of from about 80° C. to about 150° C., or more preferably from about 100° C. to about 125° C. However, for practical reasons, it is desirable to incorporate a polymerization catalyst in order to accelerate the polymerization of the coating or filling compositions. Any of the catalysts known to those skilled in the art may be employed. Examples of such catalysts which have been found to be particularly suitable are benzoyl peroxide, tertiary butyl perbenzoate, di-tertiary butyl diperphthalate, and tertiary butyl hydroperoxide. Any suitable amount of catalyst may be used, but in general the catalyst concentration will be within the range of from about 0.5 to about 2.0 percent by weight of the polymerizable liquid.

It has been found that certain clays and clay-like materials have very useful properties in conjunction with the production of thixotropic solventless varnish materials, the clay material being present in proportions ranging from 40 to 60 per cent by weight, based on the total weight of the clay and the solventless varnish. Among the clays which may be utilized in the practice of this invention are Georgia kaolin, catalpo clay, bucca clay, Kentucky ball clay and bentonite. Other thixotropic solventless varnish-filler systems are described in copending applications Serial Nos. 136,411, 136,412, 136,415, 136,416, 126,417 and 136,418 filed concurrently herewith and assigned to the same assignee as the present application. The use of these clays in the present connection is illustrated in the examples below, all parts being by weight:

Example 1

| | Parts |
|---|---|
| Diallyl phthalate | 27.0 |
| Diethylene glycol maleate | 27.0 |
| Tertiary butyl perbenzoate | 1.0 |
| Georgia kaolin | 45.0 |

The powdered Georgia kaolin was mixed in readily with the other ingredients to provide a smooth composition having good thixotropic properties. When a glass rod dipped in the composition, withdrawn, and hung in air at room temperature it showed no drainage after sixteen hours. The coating was then cured for sixteen additional hours at 100° C. Even after curing, there was no observable drainage. This absence of any drainage is in direct contradistinction to coating and filling compositions made as above but without the effective Georgia kaolin filler.

Example 2

| | Parts |
|---|---|
| Diallyl phthalate | 29.0 |
| Diethylene glycol maleate | 29.0 |
| Benzoyl peroxide | 1.0 |
| Georgia kaolin | 42.0 |

The above ingredients when mixed together yielded a smooth, highly thixotropic composition. When coated on an object there was no apparent drainage at room temperature. The coating was then cured for forty hours at 60° C., twenty-seven hours more at 100° C. and an additional forty-eight hours at 125° C. At the end of the cure cycle there was absolutely no evidence of drainage of the coating composition from the object.

Example 3

| | Parts |
|---|---|
| Diallyl phthalate | 30.5 |
| Diethylene glycol maleate | 30.5 |
| Tertiary butyl perbenzoate | 1.0 |
| Catalpo clay | 38.0 |

The above ingredients mixed readily into a smooth, homogeneous thixotropic composition. There was no drainage from a glass rod, dipped coated in the composition, after sixteen hours at room temperature. Neither was there any drainage of the coating after a sixteen hour cure at 100° C.

Example 4

| | Parts |
|---|---|
| Diallyl phthalate | 30.5 |
| Diethylene glycol maleate | 30.5 |
| Benzoyl peroxide | 1.0 |
| Catalpo clay | 38.0 |

A smooth, thixotropic composition resulted from the thorough mixing of the above materials. As in the other above examples a coating of the composition picked up on a glass rod dipped into it showed no drainage after sixteen hours at room temperature. Similarly, there was no drainage after a sixteen hour cure at 100° C.

Example 5

| | Parts |
|---|---|
| Diallyl phthalate | 28.5 |
| Diethylene glycol maleate | 28.5 |
| Tertiary butyl perbenzoate | 1.0 |
| Bucca clay | 42.0 |

The composition prepared by thoroughly mixing the above ingredients was highly thixotropic. A glass rod was dip-coated with the composition and hung in air for sixteen hours. At the end of this period no drainage had occurred. Neither had any drainage taken place after a sixteen hour cure at 100° C.

Example 6

| | Parts |
|---|---|
| Diallyl phthalate | 20.0 |
| Diethylene glycol maleate phthalate | 40.0 |
| Tertiary butyl perbenzoate | 1.0 |
| Bucca clay | 39.0 |

When a glass rod coated with the thixotropic composition resulting from mixing the above ingredients was hung at room temperature for sixteen hours there was no observable drainage of the composition from the rod. A sixteen hour cure at 100° C. was also completed without drainage.

Example 7

| | Parts |
|---|---|
| Diallyl phthalate | 15.5 |
| Diethylene glycol maleate phthalate | 46.5 |
| Tertiary butyl perbenzoate | 1.0 |
| Bucca clay | 37.0 |

The above ingredients when thoroughly mixed provided a strongly thixotropic composition. A glass rod dipped in the composition and hung in air at room temperature showed no drainage of coating material. Neither was there any drainage after a sixteen hour cure at 100° C.

Example 8

| | Parts |
|---|---|
| Diallyl phthalate | 45.0 |
| Diethylene glycol maleate phthalate | 15.0 |
| Tertiary butyl perbenzoate | 1.0 |
| Bucca clay | 39.0 |

The above ingredients when thoroughly mixed, as in the other examples, produced a composition which was highly thixotropic. There was no drainage from a coating of the composition on a glass rod after sixteen hours at room temperature. Neither was there any drainage of the coating composition after a sixteen hour cure at 100° C.

Example 9

| | Parts |
|---|---|
| Diethylene glycol maleate | 27.0 |
| Diallyl phthalate | 27.0 |
| Tertiary butyl perbenzoate | 1.0 |
| Kentucky ball clay | 54.0 |

When mixed together the above ingredients again produced a composition exhibiting pronounced thixotropic properties. A glass rod was dip-coated in the above composition and after hanging at room temperature for sixteen hours showed no signs of drainage. Neither did a sixteen hour cure at 100° C. produce any drainage.

The presence or absence of moisture in the above examples is of no importance, the thixotropic properties not being affected by variations in moisture content.

Bentonite is different in several respects in its behavior from the clays discussed above. One difference is the relatively high as-received moisture content of about 9.0% by weight. In the following example the bentonite was used as received.

Example 10

| | Parts |
|---|---|
| Diallyl phthalate | 34.5 |
| Diethylene glycol maleate | 34.5 |
| Tertiary butyl perbenzoate | 1.0 |
| Bentonite (9% moisture) | 30.0 |

The above ingredients, in which the bentonite comprises about 30.3 percent of the total weight of the polymerizable fluid and the bentonite, formed a smooth, homogeneous thixotropic composition when thoroughly mixed. A coating of the material on a glass rod showed no drainage upon hanging at room temperature for sixteen hours. Neither was there any drainage after a sixteen hour cure at 100° C.

Inasmuch as the rather high water content of the bentonite might detract from the usefulness of the above composition in certain applications such as for a dielectric insulation, the bentonite was dried at 105° C. to lower the water content to 0.3%. A coating composition made as above using bentonite with this moisture content was used to dip coat a glass rod. After sixteen hours at room temperature about 43% of the coating material had drained off. After a sixteen hour cure at 100° C. an additional one percent had drained off for a total drainage loss of about 44%. In the case of bentonite having a zero moisture content, dried at 200° C. to constant weight, about 46.5% of the coating drained off after sixteen hours at room temperature. An additional 6.4% drained off after a sixteen hour cure at 100° C. for a total drainage loss of about 53%.

Further investigation revealed that the above bentonite was alkaline in nature to the extent that when shaken with distilled water the latter showed an alkaline pH. In order to determine any possible effect of the alkalinity of the bentonite on its thixotropic producing properties, a portion of it was treated with dilute mineral acid such as hydrochloric acid until it imparted an acidic reaction (pH—5.80) to distilled water used to wash the material. When the thus acidified bentonite was used as a filler for the present materials, it was unexpectedly found that it would produce thixotropic compositions independently of its moisture content, as shown below:

Example 11

| | Parts |
|---|---|
| Diallyl phthalate | 29.5 |
| Diethylene glycol maleate | 29.5 |
| Tertiary butyl perbenzoate | 1.0 |
| Bentonite—acidic type—containing 12.6% moisture | 40.0 |

The above ingredients when stirred thoroughly yielded a smooth homogeneous thixotropic composition. There was no drainage of the coating from a dipped glass rod after sixteen hours at room temperature. Neither was there any drainage after curing for sixteen hours at 100° C.

Example 12

| | Parts |
|---|---|
| Diallyl phthalate | 24.5 |
| Diethylene glycol maleate | 24.5 |
| Tertiary butyl perbenzoate | 1.0 |
| Bentonite acidic type dried for constant weight at 105° C | 50.0 |

The above ingredients gave a smooth thixotropic composition when mixed together. There was no drainage from a glass rod coated with the above composition after sixteen hours at room temperature. Neither was there any drainage of the composition from the rod after curing for sixteen hours at 100° C.

Example 13

| | Parts |
|---|---|
| Diallyl phthalate | 22.5 |
| Diethylene glycol maleate | 22.5 |
| Tertiary butyl perbenzoate | 1.0 |
| Bentonite, acidic type, dried for constant weight at 200° C | 54.0 |

As in the preceding examples the above ingredients provided a smooth homogeneous, thixotropic composition when thoroughly mixed together. When a glass rod was dip-coated with the above composition and hung at room temperature for sixteen hours there was no drainage of the material. Neither was there any observable drainage after having been cured for sixteen hours at 100° C.

Other fillers, in addition to the effective filler described herein, may be incorporated in the composition in small amounts up to the point where the thixotropic properties are not substantially reduced. Such ineffective fillers are not in themselves capable of affording thixotropic compositions when mixed with the present polymerizable liquids. Examples of such ineffective fillers are silex or sand, talc, Carborundum, Alundum, litharge, iron powder, zirconium oxide, calcium tungstate, tungsten oxide and nickel oxide. The use of the above ineffective filler affords a convenient method of obtaining the thixotropic characteristics of the present composition while retaining a high total filler content and utilized to advantage whatever outstanding physical property (dielectric, moisture resistance, hardness, tensile strength, toughness, etc.) that the inert filler may contribute to the final heat polymerized product.

What we claim as new and desire to secure by Letters Patent of the United States, is:

1. A thixotropic composition comprising (1) a polymerizable solventless varnish comprising a liquid unsaturated alkyd resin obtained by the esterification of a mixture of ingredients comprising a polyhydric alcohol and an alpha unsaturated alpha, beta polycarboxylic acid and (2) a filler effective to maintain said composition in the fluid state under mechanical agitation and in the gel state in the absence of such agitation comprising a material selected from the class consisting of Georgia kaolin, catalpo clay, bucca clay, Kentucky ball clay, bentonite clay containing more than 0.3 percent by weight thereof moisture, and bentonite clay treated to bring the pH of the latter to the acid side, the aforesaid fillers, with the exception of the bentonite filler, comprising from 40 to 60 percent, by weight, of the total weight of the solventless varnish and the filler, the bentonite filler comprising from 30.3 to 60 percent, by weight, of the total weight of the bentonite and solventless varnish.

2. A thixotropic composition comprising (1) a polymerizable fluid comprising a liquid unsaturated alkyd resin obtained by the esterification of a mixture of ingredients comprising a polyhydric alcohol and an alpha unsaturated alpha, beta polycarboxylic acid, and (2) a filler selected from the class consisting of Georgia kaolin, catalpo clay, bucca clay, Kentucky ball clay, bentonite clay containing more than 0.3 percent, by weight, thereof moisture, and bentonite clay treated to bring the pH of the latter to an acid pH, the aforesaid fillers, with the exception of the bentonite filler, comprising from 40 to 60 percent, by weight, of the total weight of the polymerizable fluid and the filler, the bentonite filler comprising from 30.3 to 60 percent, by weight, of the total weight of the bentonite and the polymerizable fluid.

3. A thixotropic composition comprising (1) a polymerizable fluid comprising (a) a liquid unsaturated alkyd resin obtained by the esterification of a mixture of ingredients comprising a polyhydric alcohol and an alpha unsaturated alpha, beta polycarboxylic acid, (b) a polymerizable ester of an unsaturated monohydric alcohol and a polycarboxylic acid and (2) a filler selected from the class consisting of Georgia kaolin, catalpo clay, bucca clay, Kentucky ball clay, bentonite clay containing more than 0.3 percent, by weight, thereof moisture, and bentonite treated to bring the pH of the latter to the acid side, the aforesaid fillers, with the exception of the bentonite filler, comprising from 40 to 60 percent, by weight, of the total weight of the polymerizable fluid and the filler, the bentonite filler comprising from 30.3 to 60 percent, by weight, of the total weight of the bentonite and polymerizable fluid.

4. A thixotropic composition comprising (1) a polymerizable fluid comprising (a) a liquid unsaturated alkyd resin obtained by the esterification of a mixture of ingredients comprising a polyhydric alcohol and an alpha unsaturated alpha, beta polycarboxylic acid and (b) an ester of a monhydric alcohol and an unsaturated polycarboxylic acid capable of copolymerizing with the unsaturated alkyd resin, and (2) a filler selected from the class consisting of Georgia kaolin, catalpo clay, bucca clay, Kentucky ball clay, bentonite clay containing more than 0.3 percent, by weight, thereof moisture, and bentonite treated to bring the pH of the latter to an acid pH, the aforesaid fillers, with the exception of the bentonite filler, comprising from 40 to 60 percent, by weight, of the total weight of the filler and the polymerizable fluid, the bentonite filler comprising from 30.3 to 60 percent, by weight, of the total weight of the bentonite and polymerizable fluid.

5. A thixotropic composition comprising (1) a polymerizable fluid comprising (a) liquid diethylene glycol maleate obtained by the esterification of a mixture of ingredients comprising maleic anhydride and diethylene glycol, and (b) diallyl phthalate, and (2) a filler selected from the class consisting of Georgia kaolin, catalpo clay, bucca clay, Kentucky ball clay, bentonite containing more than 0.3 percent, by weight, thereof moisture, and bentonite treated to bring the pH of the latter to an acid pH, the aforesaid fillers, with the exception of the bentonite filler, comprising from 40 to 60 percent, by weight, of the total weight of the filler and the polymerizable fluid, the bentonite filler comprising from 30.3 to 60 percent, by weight, of the total weight of the bentonite and polymerizable fluid.

6. A thixotropic composition comprising (1) a polymerizable fluid containing (a) liquid diethylene glycol maleate obtained by the esterification of a mixture of ingredients comprising diethylene glycol and maleic anhydride, and (b) a polymerizable ester of an unsaturated monohydric alcohol and a polycarboxylic acid, and (2) a filler selected from the class consisting of Georgia kaolin, catalpo clay, bucca clay, Kentucky ball clay, bentonite containing more than 0.3 percent, by weight, thereof moisture, and bentonite treated to bring the pH of the latter to an acid pH, the aforesaid fillers, with the exception of the bentonite filler, comprising from 40 to 60 percent, by weight, of the total weight of the filler and the polymerizable fluid, the bentonite filler comprising from 30.3 to 60 percent, by weight, of the total weight of the bentonite and polymerizable fluid.

7. A thixotropic composition comprising (1) a polymerizable fluid containing (a) liquid diethylene glycol maleate obtained by the esterification of a mixture of ingredients comprising diethylene glycol and maleic anhydride and (b) diallyl phthalate, and (2) a filler comprising Georgia kaolin clay, the said clay comprising from 40 to 60%, by weight, of the total weight of the clay and the polymerizable fluid.

8. A thixotropic composition comprising (1) a polymerizable fluid containing (a) liquid diethylene glycol maleate obtained by the esterification of a mixture of ingredients comprising diethylene glycol and maleic anhydride and (b) diallyl phthalate, and (2) a filler comprising catalpo clay, the said clay comprising from 40 to 60%, by weight, of the total weight of the clay and the polymerizable fluid.

9. A thixotropic composition comprising (1) a polymerizable fluid containing (a) liquid diethylene glycol maleate obtained by the esterification of a mixture of ingredients comprising diethylene glycol and maleic anhydride and (b) diallyl phthalate, and (2) a filler comprising bucca clay, the said clay comprising from 40 to 60%, by weight, of the total weight of the clay and the polymerizable fluid.

10. A thixotropic composition comprising (1) a polymerizable fluid containing (a) liquid diethylene glycol maleate obtained by the esterification of a mixture of ingredients comprising diethylene glycol and maleic anhydride and (b) diallyl phthalate, and (2) a filler comprising Kentucky ball clay, the said clay comprising from 40 to 60%, by weight, of the total weight of the clay and the polymerizable fluid.

11. A thixotropic composition comprising (1) a polymerizable fluid containing (a) liquid diethylene glycol maleate obtained by the esterification of a mixture of ingredients comprising diethylene glycol and maleic anhydride and (b) diallyl phthalate, and (2) a filler comprising bentonite clay treated to bring the pH of the latter to an acid pH, the said clay comprising from 30.3 to 60%, by weight, of the total weight of the clay and the polymerizable fluid.

BIRGER W. NORDLANDER.
JOHN A. LORITSCH.

References Cited in the file of this patent

UNITED STATES PATENTS

| Number | Name | Date |
|---|---|---|
| 1,942,757 | Ileff et al. | Jan. 9, 1934 |
| 2,216,514 | Isenberg | Oct. 1, 1940 |
| 2,443,736 | Kropa | June 22, 1948 |
| 2,482,086 | Foster | Sept. 20, 1949 |
| 2,549,732 | Weaver | Apr. 17, 1951 |
| 2,557,047 | Goepfert et al. | June 12, 1951 |

OTHER REFERENCES

Industrial Chemistry of Colloidal and Amorphous Materials by Lewis, Squires, and Broughton; published 1943 by The MacMillan Co., pages 243 and 327.